United States Patent
Ozaki et al.

(10) Patent No.: US 6,721,811 B1
(45) Date of Patent: Apr. 13, 2004

(54) MESSAGE PROCESSING SCHEME FOR REALIZING UNIFIED HANDLING AND MANAGEMENT OF MESSAGES USING A PORTABLE MESSAGE PROCESSING DEVICE

(75) Inventors: Satoshi Ozaki, Kanagawa (JP); Atsushi Inoue, Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 409 days.

(21) Appl. No.: 09/704,606

(22) Filed: Nov. 3, 2000

(30) Foreign Application Priority Data

Nov. 5, 1999  (JP) .............................. 11-315880

(51) Int. Cl.$^7$ .......................... G06F 13/12; G06F 13/00
(52) U.S. Cl. ............... 710/5; 710/20; 710/72; 709/203; 709/217
(58) Field of Search .............. 710/2, 5, 20, 7, 710/36, 72; 709/200, 203, 217, 238, 250, 321, 206, 219; 455/412

(56) References Cited

U.S. PATENT DOCUMENTS

| | | | | |
|---|---|---|---|---|
| 5,613,108 A | * | 3/1997 | Morikawa .................... 707/200 |
| 5,634,005 A | * | 5/1997 | Matsuo ......................... 709/206 |
| 5,928,325 A | * | 7/1999 | Shaughnessy et al. ....... 709/206 |
| 6,003,068 A | * | 12/1999 | Sopko .......................... 709/205 |
| 6,532,489 B1 | * | 3/2003 | Merchant ..................... 709/206 |

* cited by examiner

*Primary Examiner*—Kim Huynh
(74) *Attorney, Agent, or Firm*—Oblon, Spivak, McClelland, Maier & Neustadt, P.C.

(57) ABSTRACT

A message processing scheme capable of realizing both a portability and a unified way of handling and managing e-mails of a given user is disclosed. The collective message processing and the unified message accesses are realized by storing and managing messages from a plurality of message delivery servers in the message processing device that is unique to the user. All mails destined to the user are collected at the message processing device regardless of a current location of the user, so that the user only needs to view mails on this message processing device.

13 Claims, 6 Drawing Sheets

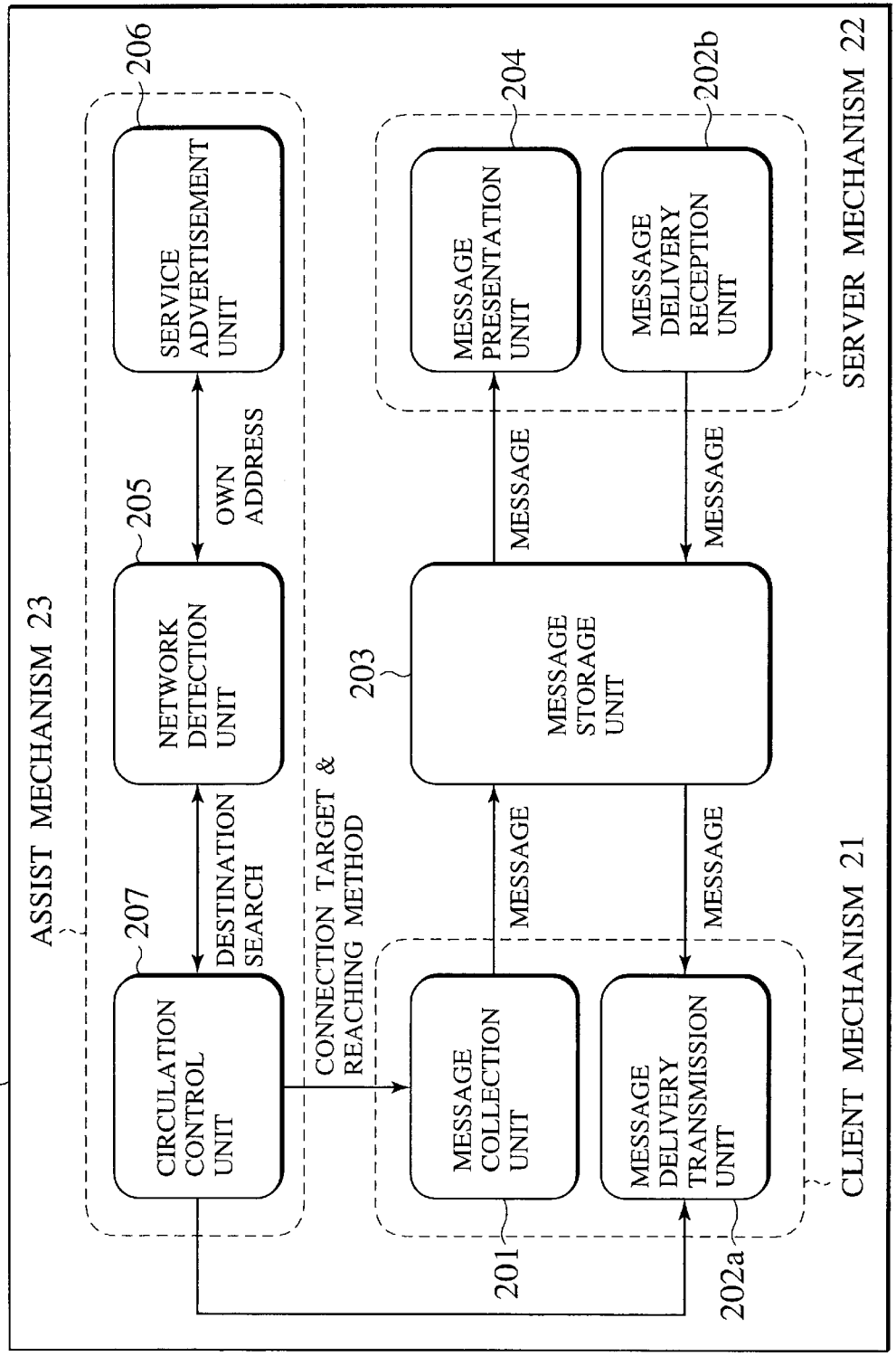

FIG.3

[UNIV]
mailserver=pop.univ.ac.jp
username=ozaki
protocol=POP3
options=-1 50000 -B 20
*.isp.ne.jp=DIRECT
*.external.foo.co.jp=DIRECT
*.foo.co.jp=SOCKS:202.249.10.98/-5

[ISP]
mailserver=pop.isp.ne.jp
fetchmailrc=.fetchmailrc-isp
username=ozaki
*.isp.ne.jp=DIRECT
*.external.foo.co.jp=DIRECT
*.foo.co.jp=SOCKS:202.249.10.98/-5

[FOOEXT]
mailserver=pop.external.foo.co.jp
*.isp.ne.jp=DIRECT
*.external.foo.co.jp=DIRECT
*.foo.co.jp=SOCKS:202.249.10.98/-5

[FOOINT]
mailserver=mailhost.internal.foo.co.jp
*.external.foo.co.jp=NONE
*.foo.co.jp=DIRECT

FIG.4
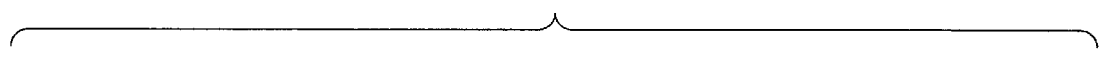
OLDER MAIL → NEWER MAIL
(a) 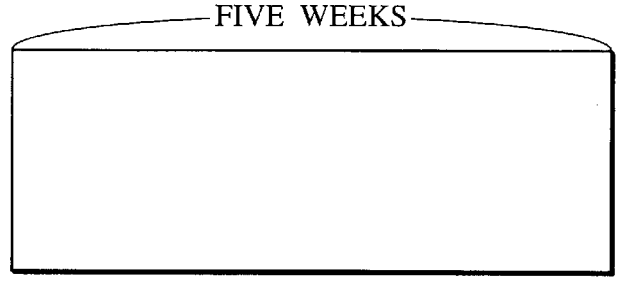
FIVE WEEKS
(b) 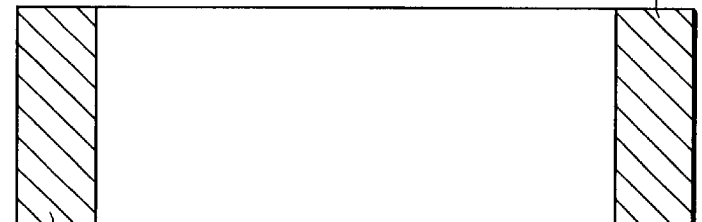
ARCHIVE(ONE DAY)
EXPIRED(ONE DAY)
(c) 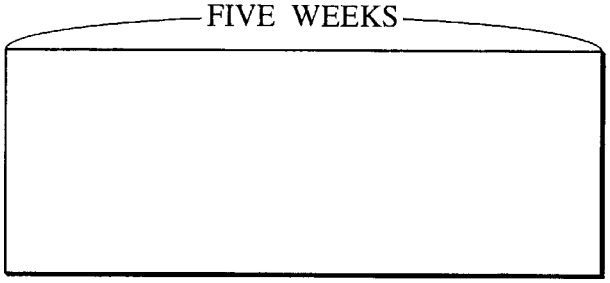
FIVE WEEKS

MESSAGE PROCESSING SCHEME FOR REALIZING UNIFIED HANDLING AND MANAGEMENT OF MESSAGES USING A PORTABLE MESSAGE PROCESSING DEVICE

BACKGROUND OF THE INVENTION

1. Field of the Invention

The present invention relates to a message processing device, a message processing system and a message processing method for exchanging messages with message servers on networks.

2. Description of the Background Art

Conventionally, many instruments have been developed for the purpose of reading and writing e-mails anywhere anytime, including small instruments such as a portable telephone incorporating a function for reading and writing e-mails and a dedicated instrument for reading and writing e-mails equipped with small display and input devices, and a notebook PC which is a general purpose PC in a portable size.

These instruments commonly encounter a dilemma that a compact size of an instrument suitable for portable use tends to spoil the convenience in operation due to small sizes of the display device and the input device on one hand, and larger sizes of the display device and the input devices desirable for the better convenience in operation tend to spoil the portability of an instrument on the other hand.

For this reason, it has been a fairly common practice for a single user to use multiple instruments each in its proper way, as in the case of carrying around a portable instrument for reading and writing e-mails while going out, and using another instrument different from a portable instrument such as PC for reading and writing e-mails while staying in the office or home, for example. However, in such a case, it has been difficult to operate an instrument such as PC that is used for reading and writing e-mails at the office or home, in conformity with data of the portable instrument without causing any contradiction.

As described, the conventional mail processing instruments have been associated with a problem that a consideration for the portability spoils the handling and a consideration for the handling spoils the portability. Moreover, in the case where a single user uses both an instrument with a good portability and an instrument with a good handling, certain e-mails can only be read or written by a specific instrument so that there has been a need to choose an instrument according to which e-mails one wishes to read or write. In other words, it has been impossible to realize a unified way of handling and managing e-mails.

SUMMARY OF THE INVENTION

It is therefore an object of the present invention to provide a message processing device, a message processing system, and a message processing method which are capable of realizing both a portability and a unified way of handling and managing e-mails of a given user.

It is another object of the present invention to provide a message processing device that has good portability and handling together, and a message processing system and a message processing method using such a message processing device.

According to one aspect of the present invention there is provided a message processing device to be carried around by a user and used by being connected to different networks at different times, comprising: a registration unit configured to register a plurality of message servers which are distributedly located on a plurality of network, according to a command of the user; a determination unit configured to recognize a network to which the message processing device is currently connected, and determine communication methods for accessing the message servers registered by the registration unit; a memory unit configured to store messages in the message processing device; a message collection unit configured to collect messages destined to the user which are delivered from the message servers, using the communication methods determined by the determination unit, and storing the messages into the memory unit; and a message transmission unit configured to transmit the messages stored in the memory unit, in response to a request from another device for carrying out message input/output which is connected to the network to which the message processing device is currently connected.

According to another aspect of the present invention there is provided a message processing device to be carried around by a user and used by being connected to different networks at different times, comprising: a notification unit configured to notify an address of the message processing device to another device for carrying out message input/output which is connected to a network to which the message processing device is currently connected; a memory unit configured to temporarily storing a transmission message entered from said another device, in response to a request from said another device; a message server selection unit configured to specify a selected message server which is reachable to a destination of the transmission message among a plurality of message servers which are distributedly located on a plurality of network; and a transfer unit configured to transfer the transmission message temporarily stored in the memory unit to the selected message server specified by the message server selection unit.

According to another aspect of the present invention there is provided a message processing system for carrying out message exchanges with a plurality of message servers which are distributedly located on a plurality of network specified by a user, comprising: a message processing device to be carried around by the user and used by being connected to different networks at different times; and another device for carrying out message input/output with respect to the message processing device; wherein the message processing device includes: a notification unit configured to notify an address of the message processing device to said another device which is connected to a network to which the message processing device is currently connected; a memory unit configured to store messages in the message processing device; a message collection unit configured to collect messages destined to the user by accessing the message servers according to information regarding communication methods for accessing the message servers from the network to which the message processing device is currently connected, and storing the messages into the memory unit; a message transmission unit configured to transmit the messages stored in the memory unit, in response to a request from said another device; and a transfer unit configured to transfer a transmission message having a destination message server which is reachable from the network to which the message processing device is currently connected, among transmission messages entered from said another message, in response to a request from said another device.

According to another aspect of the present invention there is provided a message processing method in a message processing device to be carried around by a user and used by being connected to different networks at different times, comprising the steps of: recognizing a network to which the message processing device is currently connected, and determining communication methods for accessing a plurality of message servers which are distributedly located on a plurality of network and registered in the message processing device in advance; collecting messages destined to the user which are delivered from the message servers, using the communication methods determined by the determining step, and storing the messages into a memory provided in the message processing device; and transmitting the messages stored in the memory, in response to a request from another device for carrying out message input/output which is connected to the network to which the message processing device is currently connected.

Other features and advantages of the present invention will become apparent from the following description taken in conjunction with the accompanying drawings.

BRIEF DESCRIPTION OF THE DRAWINGS

FIG. 2 is a block diagram showing an exemplary configuration of a message processing device according to one embodiment of the present invention.

FIG. 3 is a diagram showing one example of a rule table to be used in the message processing device of FIG. 2.

FIGS. 4a–c is a diagram for explaining archive and expire functions that can be provided in the message processing device of FIG. 2.

DETAILED DESCRIPTION OF THE PREFERRED EMBODIMENTS

Figure 1:
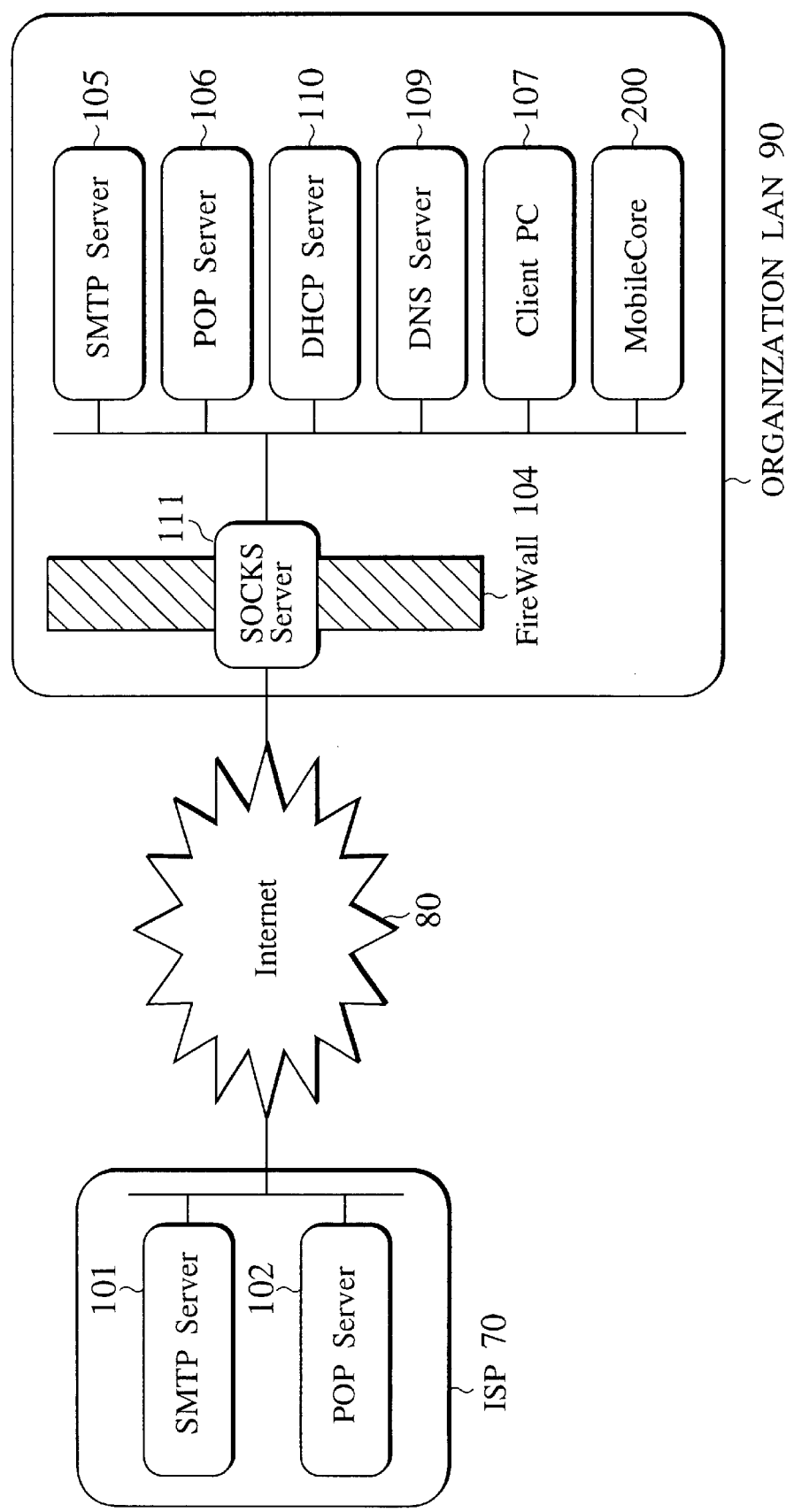
FIG. 1 is a diagram showing an exemplary configuration of a network system to which a message processing device according to one embodiment of the present invention is to be connected.

First, the basic features of the present invention will be outlined.

In the present invention, a portable message processing device is used to collect messages regardless of locations or instruments to be used in reading or writing messages.

In collecting messages, basically all the messages stored in message serves are transferred to the message processing device and then deleted from the message servers, for example. It is possible to adopt a policy for preserving data on the message servers as a backup of message data. In the latter case, only unread messages will be copied into the message processing device. It is also possible to adopt a policy of not copying large messages under a poor communication state as an exception.

In the case of viewing messages at another device, it is preferable to display messages at another device while also maintaining them in this message processing device rather than giving them completely to another device. In this way, it is possible to prevent scattering of messages collected at the message processing device.

Also, in the present invention, a protocol (communication method) to be used in collecting messages is changed according to a positional relationship between a network to which the message processing device is connected and a network on which the message server exists.

Apart from a possibility that a network to which the message processing device is connected may be different at different times, there is also a possibility that other devices connected to that network may be different at different times. Namely, a user can connect the message processing device that he/she carries around to another device associated with that location (such as a desk-top PC in the office, a notebook PC at the home, or a portable telephone in the case of being outside of the office or home, for example), and use the message processing device and that another device as a single (mail) client.

In this way, a (mail) user can be freed from a problem that messages taken into one computer cannot be viewed at another computer or that messages taken into one computer can be viewed at another computer by maintaining them in the message server but then a log management becomes difficult as encountered in the case of POP, and a problem that messages can be viewed only within a range covered by one message server as encountered in the case of IMAP.

As such, according to the present invention, it becomes possible to realize a centralized management of messages delivered from a plurality of information servers on networks, at the message processing device. In addition, messages stored in this message processing device can be handled in a unified way.

Moreover, a better handling can be obtained by utilizing a user interface of another device that is operated in cooperation with this message processing device, and a better portability can be obtained by providing a user interface on this message processing device itself.

For example, by using common data in a PC or the like that is used at the office or home and in a portable device, it becomes possible to realize a function for using data in conformity without causing any contradiction and enabling operation on data by using an instrument on which display and input are easier such as PC.

Furthermore, the present invention provides a message processing device through which desired messages can be originated from the other device for carrying out message input/output that is connected to the same network as the message processing device.

Here, the message processing device notifies its own address to the other device such that an SMTP server setting of the other device is changed to this message processing device, for example. In this case, mails will be sent while this message processing device itself plays a role of the SMTP server.

Referring now to FIG. 1 to FIG. 6, one embodiment of a message processing device, a message processing system and a message processing method according to the present invention will be described in detail.

FIG. 1 shows an exemplary configuration of a network system to which a message processing device of the present invention is connected.

This network system has a network configuration in which a plurality of Internet service providers (ISP) and a plurality of organization LANs (or Intranets) are interconnected through the Internet 80 which is a global network (only one ISP 70 and one organization LAN 90 are shown in FIG. 1).

A message processing device (MobileCore) 200 is a portable device which is capable of being (directly) connected to the ISP or the organization LAN by radio or wire communications. FIG. 1 shows an exemplary state where the message processing device 200 is connected to the organization LAN 90.

It is assumed that a user of this message processing device 200 has accounts at one or more ISPs and one or more organization LANs, or two or more ISPs, or two or more organization LANs. For example, the message processing device 200 has accounts at the ISP 70 and the organization LAN 90. Namely, this message processing device 200 can handle e-mails destined to a plurality of mail addresses possessed by that user.

The ISP 70 is provided with an SMTP server 101 which is a mail sending server and a POP server 102 which is a mail receiving server.

The organization LAN 90 is provided with a FireWall 104 placed at a boundary of this LAN and the other networks, a SOCKS server 111 to be used at a time of transferring mails across the FireWall 104, an SMTP server 105 which is a mail sending server, a POP server 106 which is a mail receiving server, a DHCP server 110 for dynamically allocating IP addresses to devices connected to this LAN, a DNS server 109, and a user agent (client PC) 107 for providing functions to read and write mails to a user.

The function of each element described above that is relevant to this embodiment is as follows.

The SMTP server 101 has a function for receiving mails sent by users who have accounts at the ISP 70 and forwarding these mails to destinations indicated in the mails as proxy for the users.

The POP server 102 has a function for temporarily keeping mails destined to users who have accounts at the ISP 70 and delivering these mails to the users according to requests from the users.

The Internet 103 has a function for interconnecting various networks.

The FireWall 104 has a function for passing only those communication data that satisfy a passing condition and blocking those communication data which do not satisfy the passing condition (or those communication data which satisfy a blocking condition) at a border between the Internet 103 and the organization LAN 90.

The SOCKS server 111 has a function for carrying out a user authentication to check if a user who is attempting to be connected to the organization LAN 90 is a registered user or not, and modifying those communication data which do not satisfy the passing condition of the FireWall 104 into forms that satisfy the passing condition so that they can pass through the FireWall 104.

The SMTP server 105 has a function for receiving mails sent by users who are connected to the organization LAN 90 and forwarding these mails to destinations indicated in the mails as proxy for the users.

The POP server 106 has a function for temporarily keeping mails destined to the users who are connected to the organization LAN 90 and delivering these mails to the users according to requests from the users.

The DNS server 109 provides a function for converting an IP address into a host name or vice versa and a function for deriving a mail forwarding target from a domain name, in response to a query from a device connected to the organization LAN 90.

The DHCP server 110 has a function for dynamically allocating an IP address and notifying the allocated IP address in response to a request from a device connected to the organization LAN 90. In addition, the DHCP server 110 also has a function for notifying an IP address of the DNS server 109 in response to a query from a device connected to the organization LAN 90.

The user agent (client PC) 107 has a function for operating a user interface for enabling a user to read and write mails.

The message processing device (MobileCore) 200 has a function for receiving mails destined to a user from the POP server (the POP server 102 or the POP server 106, for example) according to a command from the user, storing and managing received mails, and presenting mail data according to a viewing request from another device (the user agent 107 or a home computer, for example), as well as a function for sending mails given from another device to a corresponding SMTP server or another server for relaying them to a corresponding SMTP server.

Note that, although not shown in FIG. 1, the message processing device 200 is made to be capable of being connected to a stand alone or home network connected home computer that exists at a home or the like of the user of the message processing device 200, such that the user can operate this home computer equivalently or similarly as the user agent 107 described above.

Next, FIG. 2 shows an exemplary configuration of the message processing device 200 according to this embodiment.

This message processing device 200 comprises: a client mechanism 21 including a message collection unit 201 and a message delivery transmission unit 202a; a server mechanism 22 including a message storage unit 203, a message presentation unit 204, and a message delivery reception unit 202b; and an assist mechanism 23 including a network detection unit 205, a service advertisement unit 206, and a circulation control unit 207.

The message collection unit 201, collects mails from the POP servers.

The message delivery transmission unit 202a receives mails from another device (the user agent 107 or a home computer, for example), and transmit messages to the SMTP servers.

The message storage unit 203 stores mails collected by the message collection unit 201.

The message presentation unit 204 presents mails stored by the message storage unit 203 at another device (the user agent or the like).

The message delivery reception unit 202b receive mails from another device (the user agent or the like) and stores them into the message storage unit 203.

The network detection unit 205 detects an environment of a network to which the message processing device 200 is connected.

The service advertisement unit 206 advertises an existence of the message processing device 200 to another device (the user agent or the like) on a network to which the message processing device 200 is connected.

The circulation control unit 207 specifies an access target to the client mechanism 21.

Note that, in this embodiment, the message processing device 200 is assumed to have a function for enabling a user to operate (edit, view, search, etc.) mails using GUI (Graphical User Interface) or the like, similarly as in a portable instrument dedicated for handling mails or a notebook PC equipped with a mail function.

Also, here, it is assumed that the message processing device 200 carries out radio communications by connecting a radio communication device to the external, but it is also possible for the message processing device 200 to have a built-in radio communication function instead.

Next, the operation in this embodiment will be described in detail.

First, the case where the message processing device 200 is connected to a network such as the organization LAN 90 will be described.

The user carries the message processing device 200 around, and connects the message processing device 200 to a network such as Intranet of an office he/she works, for example.

When the message processing device 200 is connected to the network, the network detection unit 205 requests an address allocation by broadcast using the DHCP (Dynamical Host Configuration Protocol) within that network (which is assumed to be the organization LAN 90).

Upon receiving this request, the DHCP server 110 dynamically allocates an IP address, and notifies this allocated IP address and an IP address of the DNS server 109 to the message processing device 200.

The network detection unit 205 of the message processing device 200 receives the allocated IP address and the IP address of the DNS server 109 described above. The message presentation unit 204 will then be operated using this allocated IP address (which is assumed to be "m").

The service advertisement unit 206 of the message processing device 200 advertises information that "the message presentation unit 204 operates at the IP address=m" within the network by using an SLP (Service Location Protocol), for example.

The user agent 107 obtains information regarding the message presentation unit 204 that is operating in the message processing device 200 (such as "the message presentation unit 204 operates at the IP address=m" described above) that is advertised within the network by the message processing device 200, by operating an SLP client (process) for example, and updates the setting of an IMAP (Internet Message Access Protocol) server to which the user agent 107 is referring (by setting the message presentation unit 204 as the IMAP server, for example).

It is also possible for the user agent 107 to discover the message processing device 200 that is connected within the same network by transmitting a message in a prescribed format for the purpose of discovering the message processing device 200 and receiving a response message returned to the user agent 107 by the message processing device 200 which detected that message.

After this procedure, it becomes possible to operate the message processing device 200 from the user agent 107.

Note that, in the case of directly connecting a PC such as a home computer to be operated as the user agent 107 described above with the message processing device 200, it suffices to carry out a procedure for connecting them instead of the above described procedure.

Next, the cases where the message processing device 200 operates according to a request from another device such as the user agent 107 will be described.

First, the case where the message processing device 200 receives and stores mails destined to the user from the POP server (the POP server 102 or the POP server 106, for example) will be described.

Now, the message processing device 200 is capable of being connected by moving over networks, so that there is a possibility that a method for accessing from the message processing device 200 to the POP server is different depending on an environment of a network to which the message processing device 200 is connected or a relationship between a network to which the message processing device 200 is currently connected and a network at which the target POP server is located.

For this reason, in this embodiment, a relationship among a network at which the message processing device 200 has an account (a network at which the target POP server exists), a network to which the message processing device 200 is currently connected, and a suitable access method is described in advance in a rule table (.getmailrc) such that a route reaching to the target POP server is derived by referring to this rule table.

The content of the rule table can be set up by accounting not only a criterion regarding whether data actually reaches there or not but also an access policy in each network.

FIG. 3 shows an example of the rule table according to this embodiment.

In this example, it is assumed that there are four accounts including UNIV, ISP (the ISP 70 of FIG. 1, for example), FOOEXT, and FOOINT (the organization LAN 90 of FIG. 1, for example). The account name is specified within brackets [ ].

In this example, the following values can be specified with respect to each account.

mailserver: Server names of the POP server, the IMAP server, etc., are described (this description is required).

fetchmailrc: An option describing file name is described. When this is not specified, ".fetchmailrc" will be used.

username: A user name is described. When this is not specified, an option describing file name will be used. Else, a user name that is operating the circulation control unit 207 (a user name that is set up in the message processing device 200, for example) will be used.

protocol: A protocol (such as POP3, APOP, or IMAP, for example) to be used in acquiring mails is described. When this is not specified, a specification in the option describing file will be used. Else, various protocols will be tried sequentially until the access succeeds, but it is preferable to specify this in order to avoid unnecessary access attempts.

port: A port to be used by the mail acquisition protocol is described. When this is not specified, "110" (a default value of POP3 and APOP) will be used.

options: Any other command line options are described. This can be set up, for example, as:

–1 50000 which indicates an option for not receiving a mail in a size exceeding 50 KB, and

–B 20 which indicate an option for receiving only up to 20 mails per one access.

character string other than those described above: A character string other than those described above ("*.isp.ne.jp=DIRECT" in FIG. 3, for example) is compared ith host names including a domain name of a device (MobileCore) that is operating the circulation control unit 207, and a value of the first matching entry will be used as a connection method. For example, when "*.isp.ne.jp" is the first matching entry, its value "DIRECT" indicates its connection method. If there is no matching entry nothing will be done.

Note that "*" can be used only at a top or an end of the character string. In other words, it is assumed that "*" can be used only in a form of "133.196.16.*" or in a form of "*.foo.co.jp".

Here, the available connection method includes the following.

NONE: Nothing will be done (a case where a connection is impossible, for example).

DIRECT: A direct connection will be made.

SOCKS: A connection across the FireWall will be made by using the SOCKS protocol. In this case, an address of the SOCKS server will be written in an <IPADDRESS>portion of SOCKS:<IPADDRESS>. Note that a suffix "/–5" for indicating the use of the SOCKS protocol version 5 can be attached in a form of SOCKS:<IPADDRESS>/–5, and the SOCKS protocol version 4 will be used when this suffix is not attached.

In the example of FIG. 3, the FireWall is provided only at FOOINT, and the rule table of FIG. 3 indicates a setting in which UNIV, ISP and FOOEXT can be directly connected with each other, but there is a need to make a connection across the FireWall by using SOCKS in order to access from FOOINT to the POP server in UNIV, ISP, or FOOEXT, and an access from UNIV, ISP or FOOEXT to the POP server in FOOINT is not allowed.

Consequently, in an example of FIG. 1, for example, when the message processing device 200 is connected to a network "internal.foo.co.jp", a setting that there is the FireWall 104 on the reaching route at a time of connection to the POP server 102 so that the FireWall 104 should be passed by using the SOCKS server and the SOCKS protocol version 5 (that is, "*.foo.co.jp=SOCKS:202.249.10.98/–5" in [ISP] of FIG. 3, for example), or there is no FireWall 104 on the reaching route at a time of connection to the POP server 106 so that a direct connection should be made (that is, "*.foo.co.jp"=DIRECT" in [FOOINT] of FIG. 3, for example), will be registered in advance.

Now, the user commands the mail reception to the message processing device 200 through the user agent 107 or the like, or by using the GUI or the like of the message processing device 200 itself, after the message processing device 200 is connected to the network as described above.

Here, the reception target POP server may be specified at a time of commanding the mail reception, or may be registered in the message processing device 200 in advance, or else both of them may be used appropriately.

When the mail reception is commanded, the network detection unit 205 of the message processing device 200 judges a network to which the message processing device 200 is connected, from the allocated IP address described earlier, and derives a route reaching to the specified POP server by referring to the rule table (FIG. 3) provided in advance.

In an example of FIG. 1, when the user commanded connections to the POP server 102 and the POP server 106, because the message processing device 200 is currently connected to a network "internal.foo.co.jp" and assuming that the rule table is set up similarly as [ISP] and [FOOINT] of FIG. 3, for example, the connection to the POP server 102 will be made by using the SOCKS protocol version while the direct connection to the POP server 106 will be made.

Then, after being connected to the POP server 102 and the POP server 106, the message collection unit 201 of the message processing device 200 receives mails kept at the respective servers and stores them in the message storage unit 203.

Note that, the above description is directed to the case where the user commands the mail reception to the message processing device 200, but instead of that, it is also possible to set up a mail reception condition (a policy of one reception per day and its time, for example) in the message processing device 200 in advance such that the mails will be automatically received and stored at any suitable timing after the above described condition is satisfied.

Note also that there are cases where it is desirable to set up a limitation on the amount of mails to be received according to various factors such as an available mail storage capacity of the message processing device 200, a state of the communication path, etc.

For example, when the message processing device 200 takes out mails from the POP server, if the communication path such as a connection via a portable telephone is a narrow bandwidth network, receiving a mail in a large size would require a long communication time. For this reason, a connection target for which such a narrow bandwidth network has to be used can be described in the rule table (FIG. 3) provided in advance and a mail size can be checked before actually taking out a mail from the POP server, such that a mail in a large size will not be acquired and the communication time can be shortened (in such a case, a mail in a large size will be received when a sufficiently wide bandwidth network is available later on).

For instance, as in [UNIV] of FIG. 3, by describing "options=–l 50000" in that entry, it is possible to specify a policy of not acquiring a mail in a size exceeding 50 KB.

Also, for example, when the message processing device 200 takes out mails from the POP server, if the communication path such as a connection via a portable telephone is a narrow bandwidth network, receiving many messages would require a long communication. For this reason, a connection target for which such a narrow bandwidth network has to be used can be described in the rule table (FIG. 3) provided in advance and the number of mails to be acquired by one access to the POP server can be limited, such that the communication time required for one access can be shortened (in such a case, remaining mails will be received when a sufficiently wide bandwidth network is available later on).

For instance, as in [UNIV] of FIG. 3, by describing "options=–B 20" in that entry, it is possible to specify a policy of limiting the number of mails to be acquired by one access to only up to 20 mails.

Note that [UNIV] in the rule table of FIG. 3 actually describes a plurality of limitations in a form of "options=–l 50000 –B 20", and in such a case, the limitations will be applied together (so that only up to 20 mails each in a size not exceeding 50 KB will be received, for example).

Next, the case where the message processing device 200 presents a mail stored therein in response to a request for viewing or the like from another device such as the user agent 107 (that is, the case of operating a mail stored in the message processing device 200 from another device such as the user agent 107) will be described.

The user operates the user agent 107 to make a connection request to the message presentation unit 204 of the message processing device 200.

The message presentation unit 204 of the message processing device 200 starts its operation in response to the connection request from the user agent 107.

The user agent 107 commands various operations such as viewing, deletion or classification of a mail stored in the message storage unit 203 of the message processing device 200 to the message presentation unit 204 according to the user command, using IMAP for example.

The message presentation unit 204 carries out an operation according to the command on the message stored in the message storage unit 203.

Note that a mail stored in the message processing device 200 can also be operated by using the GUI or the like of the message processing device 200 itself, similarly as in a portable dedicated mail handling instrument or a notebook PC equipped with a mail function.

Now in the case of operating a mail stored in the message processing device 200 from another device such as the user agent 107, there can be cases where that another device is not equipped with a sufficient function or device for handling a mail.

For this reason, the message processing device 200 may change a mail presentation method or the like according to a function or a performance provided in that another device, or a procedure or the like that can be processing by that another device.

For example, in the case the user agent 107 cannot use a protocol called IMAP, the message processing device 200 may present a mail by utilizing a protocol that can be used at the user agent 107 (such as HTTP).

Namely, the message processing device 200 may operate both IMAP and HTTP to accept respective requests, and present a mail according a protocol which actually received a request. Alternatively, the message processing device 200 may carry out a negotiation regarding a protocol to be used with the user agent 107 prior to a mail exchange.

Also, in the case where a display capability of the user agent 107 is limited as in the case where the user agent 107 has a small display region, for example, the message processing device 200 may present a mail to the user agent 107 after applying some processing such as that for extracting a part of a mail (only a newly added part as a reply mail, for example) according to a request of the user agent 107.

Next, a mail storage management (archive, expire) in the message processing device 200 will be described.

The message processing device 200 of this embodiment receives and stores mails from the POP server, but a capacity of a built-in memory is limited, so that it is preferable to store (archive) mails in the message processing device 200 into an external memory device and delete (expire) those mails that are stored into the external memory device from a memory inside the message processing device 200 according to the need.

For example, assuming that mails are to be received from the POP server everyday, suppose that the received mails of the past five weeks are to be stored in the message processing device 200 as shown in a part (a) of FIG. 4. In this case, a group of newly received mails of the latest one day that are stored in the message processing device 200 will be stored into an external memory device while a group of mails received at the oldest one day of the five weeks ago that are stored in the message processing device 200 are deleted (the deleted group of mails are already stored in the external memory device), as shown in a part (b) of FIG. 4. As a result, the received mails of a new five week period will be stored in the message processing device 200 as shown in a part (c) of FIG. 4 (the group of mails for these five weeks are also stored in the external memory device).

Apart from a method for archiving and expiring mails according to a predetermined timing condition as described above, it is possible to consider various methods including a method for archiving and expiring mails according to a condition that accounts for a memory capacity, such as a method in which, when an available memory capacity of the message processing device 200 becomes lower than a first threshold, older received mails are deleted sequentially until the available memory capacity exceeds a second threshold, and a method using the above described methods in combination.

It is also possible to allow the user to set the method of archiving and expiring mails appropriately.

Note that different external memory devices for storing mails may be used according to mail addresses or the like.

It is also possible to store specified mails or those mails that satisfy a specified condition without deleting them as an exception to the above described control.

It is also possible to adopt a method for directly connecting the external memory device to the message processing device 200 (a method for storing mails directly from the message processing device 200 into the external memory device), or a method for connecting the external memory device to another device such as the user agent 107 or a home computer (a method for storing mails from the message processing device 200 via another device into the external memory device).

For the above described processing (storing or deleting) for the mail storage management, it is possible to adopt a method for automatically activating it according to a prescribed condition by the message processing device 200 (in a state where the message processing device 200 is connected to the external memory device in the case of the former connection method, or in a state where the message processing device 200 is connected to another device such as the user agent 107 in the case of the latter connection method), a method for activating it by a user operation with respect to the GUI or the like of the message processing device 200, or a method for activating it via another device such as the user agent 107.

For example, the user agent 107 may command the message presentation unit 204 of the message processing device 200 to retrieve and present mails that satisfy a user specified condition (such as that a certain number of days have elapsed, for example), either regularly or according to a user command. The message presentation unit 204 then carries out a retrieval according to the command with respect to messages stored in the message storage unit 203, and presents a group of mails that constitute the retrieval result. The user agent 107 then stores the presented group of mails into the external memory device.

Also, for example, the user agent 107 commands the message presentation unit 204 of the message processing device 200 to retrieve and delete those mails that satisfy a user specified condition (such as that a certain number of days have elapsed), either regularly or according to a user command. The message presentation unit 204 carries out a retrieval according to the command with respect to messages stored in the message storage unit 203, and deletes the corresponding group of mails.

Next, the case of transmitting a mail given from another device such as the user agent 107 to a corresponding SMTP server (or another server for relaying it to a corresponding SMTP server) will be described.

In the case where the user creates a new mail or a reply mail with respect to a received mail, the user agent 107 sends the mail by using the SMTP protocol according to the user command.

At that point, the message processing device 200 is specified as a mail sending SMTP server in the user agent 107.

The message delivery reception unit 202*b* of the message processing device 200 receives the mail from the user agent 107 and stores it in the message storage unit 203.

The message delivery transmission unit 202*a* of the message processing device 200 calculates a network domain to which the mail should be transmitted from a destination mail address of an untransmitted message stored in the message storage unit 203 according to a command of the circulation control unit 207, and inquires an SMTP server that should be accessed in order to deliver the mail to that network domain (an SMTP server having a reachability to that network domain) to the DNS server 109 and obtains it from the DNS server 109.

Then, the mail is transmitted to the obtained SMTP server.

Note that, in the case where the SMTP server having a reachability to that network domain cannot be obtained, the mail to be transmitted to that network domain will be transmitted after this message processing device 200 is connected to another network on which the SMTP server having a reachability to that network domain exists, for example.

Note also that the SMTP server that should be accessed may be set manually.

According to the message processing device 200 as described above, even in the case where some user has a plurality of accounts, and the message processing device 200 and an instrument (another device that cooperates with the message processing device 200) such as PC for having mails destined to each mail address are connected to different networks and located at mutually distanced locations, it is possible to realize a centralized management of mails destined to a plurality of mail addresses at a single location by storing them in this message processing device 200, and the user can easily carry this message processing device 200 around and use it singly while moving or use it in cooperation with another device at a visited site. In addition, the backup or deletion of mails downloaded into the message processing device 200 can be realized easily.

Note that when mails stored in the POP server are downloaded into the message processing device 200, these mails may be deleted from that POP server. In such a case, original data of the mails are stored in the message processing device 200 while their backup data are stored in the external memory device.

It is also possible to adopt a policy that, even when mails stored in the POP server are downloaded into the message processing device 200, these mails are not deleted from that POP server immediately, and these mails are deleted only when a prescribed condition such as an elapse of a prescribed period of time is satisfied.

Now, in the-following, as a concrete example of the message processing device of this embodiment, the mail processing to be carried out by the message processing device in conjunction with actual user operations will be described in detail, assuming a use of a device which has overall size and weight similar to the compact dedicated mail terminal, a display screen and a keyboard-or the like in sizes similar to those of the compact dedicated mail terminal, and connectors for Ethernet and a portable telephone.

Figure 5:
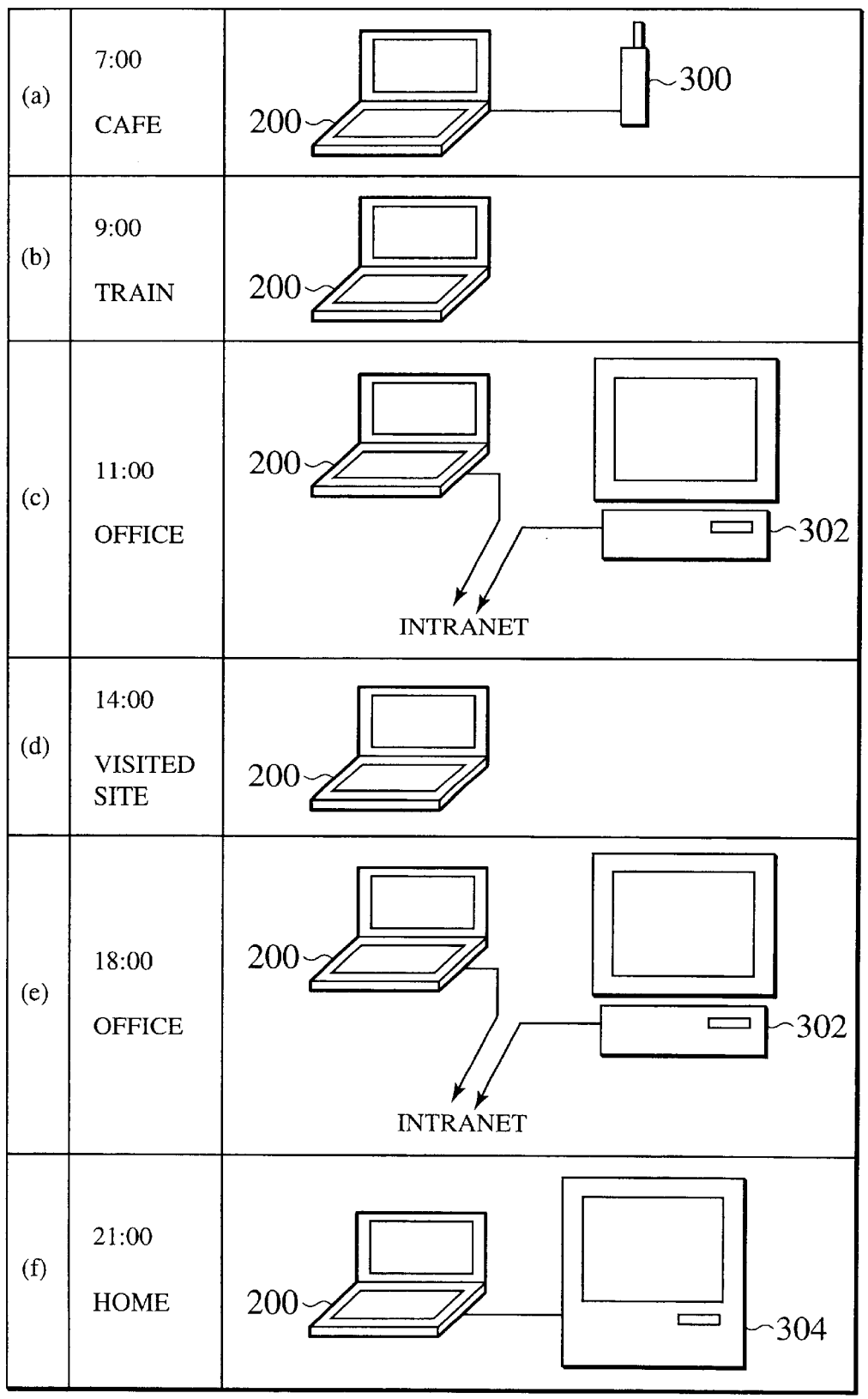
FIG. 5 is a diagram showing an exemplary manner of utilizing the message processing device of FIG. 2 by a typical mobile user.

First, as shown in FIG. 5, an activity of a typical mobile user on a single day is assumed to proceed in the following sequence. Here, the mobile user is assumed to carry around an instrument which is the message processing device of the present invention, an ordinary notebook PC or a portable dedicated mail terminal.

Step 1: He leaves his home in the morning, with that instrument 200.

Step 2: He orders a morning set at a cafe, connects a portable telephone 300 to the instrument 200, and Just receives mails while taking breakfast (a part (a) of FIG. 5).

At this point, if the message processing device of the present invention is used, it is possible to receive mails destined to a plurality of mail addresses collectively.

Step 3: He goes to his office by train. At a seat in the train, he glances through the received mails by operating the instrument 200 (a part (b) of FIG. 5).

At this point, if the message processing device of the present invention is used and if mails destined to a plurality of mail addresses are received at Step 2, it is possible to view any of these mails.

Step 4: He arrives at his office. He creates reply mails with respect to the received mails.

At this point, if the message processing device of the present invention is used, it is possible to connect the message processing device to the intranet of the office via Ethernet, and operate it from a large sized PC 302 (a part (c) of FIG. 5). Also, if there is a large sized mail that could not have received at Step 2, it can be received at this point. Also, if mails destined to a plurality of mail addresses are received, reply mails with respect to them can be send at this point.

Step 5: He goes out to visit a client, bringing the instrument 200 along with him. At a visited site, he answers questions posed by the client, by operating the instrument 200 to search out past mails of the similar case.

Step 6: He returns to his office from the visited site.

At this point, if the message processing device of the present invention is used, it is possible to store a backup of newly arrived mails in the instrument 200 into the external memory device via the PC 302 in the office, and delete old mails in the instrument 200 (a part (e) of FIG. 5).

Step 7: He goes home by train. He glances through private mails.

Step 8: After the dinner, he creates reply mails with respect to the received private mails.

At this point, if the message processing device of the present invention is used, it is possible to connect the message processing device to a home computer 304 and operate it from the home computer 304 (a part (f) of FIG. 5).

Step 9: Before he goes to bed, he makes a backup of the private mails and deletes old mails.

At this point, if the message processing device of the present invention is used, it is possible to store the backup of newly arrived mails in the instrument into the external memory device via the home computer, and delete old mails in the instrument (a part (f) of FIG. 5).

Now, the convenience in use and the easiness of the processing at each of the above described steps will be evaluated from viewpoints of a user A who uses the message processing device of the present invention, a user B who uses an ordinary notebook PC, and a user C who uses a dedicated mail terminal.

Step 1: Carrying the instrument around;

In view of a size and a weight of the instrument, the ordinary notebook PC of the user B is clearly inferior to the others.

Step 2: Communications using a portable telephone;

The ordinary notebook PC requires installation of a peripheral device for a portable telephone (a communication card) and execution of a connection sequence, because it is a general purpose computer, whereas the others support a dedicated port for a portable telephone so that the operation is easier for the users A and C (see a part (a) of FIG. 5).

Step 3: Use of the instrument while moving;

In view of a size and a weight of the instrument, the ordinary notebook PC of the user B has a poorer handling (see a part (b) of FIG. 5).

Step 4: Ordinary input/output;

The dedicated mail terminal of the user C has a poorer input device so that it has a poorer handling. The message processing device of the present invention used by the user A can be used in cooperation with the office PC and operated using screen, keyboard, mouse, etc., of the office PC so that it can realize a handling equivalent to the ordinary notebook PC of the user B or far better than that depending on the office PC (see a part (c) of FIG. 5).

Step 5: Searching past mails at a visited site;

The users A and B can deal with this task by searching past mails on site (see a part (d) of FIG. 5), but the dedicated mail terminal of the user C does not presuppose such a way of use and the past mails must be stored in the office so that the user C cannot deal with this task.

Step 6: Mail synchronization upon returning from a visited site;

The user A can complete this task in a short period of time because only mails received after the previous backup will be backed up, and the deletion of old mails can be done automatically (see a part (e) of FIG. 5). On the other hand, the users B and C are required to do some manual processing.

Step 7: Viewing mails of another account via ISP;

This step is similar as Step 2 and Step 3 described above.

Step 8: Mail transmission to another account via ISP;

This step is similar as Step 4 described above (see a part (f) of FIG. 5).

Step 9: Mail synchronization for ISP account;

This step is similar to Step 6 described above (see a part (f) of FIG. 5).

As in the case of the dedicated mail terminal, when a thing to be carried becomes smaller, an input/output portion constituting a user interface inevitably also becomes smaller so that it has a poorer convenience in use. On the other hand, as in the case of the notebook PC, a thing with a large user interface tends to be bulky so that it is difficult to carry around. From a viewpoint of the user's convenience, it is desirable to have a thing which is small and not bulky at a time of carrying it around, and which has a large user interface at a time of using it. These conditions are basically incompatible with each other and cannot be fulfilled simultaneously to the satisfactory degree by the conventional dedicated mail terminal or PC.

In the message processing device of the present invention, it is possible to fulfill these conditions simultaneously because it has a size similar to or smaller than the dedicated mail terminal so that it can be carried around easily, while at a time of use it can be operated by connecting it easily to a device available nearby which has a more convenient user interface such as PC or PDA.

Namely, according to the message processing device of the present invention, it is possible to read and write mails by operating the message processing device singly in the case where a device such as PC is not available nearby as in the case of going out. In addition, in the case where a device such as PC is available nearby as in the case of staying in the office or home, it is possible to read and write mails by viewing data inside the message processing device from the outside by connecting the message processing device to a device such as PC through a network.

On the other hand, it is also possible to consider using different instruments according to the circumstances, as in the case of using a PC in the office and a dedicated mail terminal at a visited site. However, in such a case, messages to be read are written will be scattered among different instruments so that the unified handling is difficult and a problem of not having the necessary mail in the instrument at hand may be encountered.

In the message processing device of the present invention, any desired mails can be read and written no matter which device is used in cooperation, so that the messages will not be scattered and the unified handling becomes possible.

Now, in the following, some examples of the backup policy for taking full advantage of the characteristics of the message processing device 200 will be described.

This message processing device realizes the centralized storing of original data of mails in order to enable the unified handling, but this feature can also induce a potential danger of losing all mails collected at a single location (the message processing device) due to malfunction or loss of the message processing device. In order to prevent this from happening, it is preferable to provide a backup function. On the other hand, a memory region of the message processing device is finite so that it cannot keep storing mails unlimitedly, and therefore it is preferable to provide an expire processing for deleting mails from this message processing device by selecting appropriate mails at appropriate timings.

There are several possible policies regarding criteria for implementing these two functions of backup and expire.

For example, as a typical example, it is possible to adopt a backup policy for making a backup of entire messages arrived up to a current timing since the last backup time, and an expire policy for sequentially deleting older messages until a necessary vacant capacity is obtained.

It is also possible to set up a policy such that copying to the message processing device is not necessary required and there is an exception that a copying of a message that requires a large capacity will not be made when a communication state is poor, for example.

As far as the reading by another device is concerned, it is also preferable to display messages at another device while also maintaining them in the message processing device rather than giving them completely to another device. In this way, it is possible to prevent scattering of messages collected at the message processing device.

Also, a protocol (communication method) to be used in collecting messages is changed according to a positional relationship between a network to which the message processing device is connected and a network on which the POP server exists.

Apart from a possibility that a network to which the message processing device is connected may be different at different times, there is also a possibility that other devices connected to the same network may be different at different times. Namely, the user can connect the message processing device that he/she carries around to another device associated with that location (such as a desk-top PC ion the office, a notebook PC at the home, or a portable telephone in the case of being outside of the office or home, for example), and use the message processing device and that another device as a single mail client.

In summary, the message processing device of this embodiment in its typical manner of utilization can realize functions of:

collecting messages (mails) stored in a plurality of POP servers as a POP client; and provides a service for viewing the collected messages with respect to another mail processing device (PDA or PC) as an IMAP server.

As a result, from a viewpoint of the user, there is a significant advantage that it is possible to resolve all of the following problems:

a problem that messages taken into one computer cannot be viewed at another computer or that messages taken into one computer can be viewed at another computer by maintaining them in the message server but then a log management becomes difficult as encountered in the case of using only the conventional POP server; and a problem that messages can be viewed only within a range covered by one message server as encountered in the case of using only the conventional IMAP service.

Here, by notifying an address of the message processing device to another device for carrying out message input and output that is connected to the same network as the message processing device, the SMTP server setting of that another device is changed to this message processing device. In this case, the message processing device will be operated in such a form that this message processing device itself becomes an SMTP server for carrying out the mail transmission.

Thus, according to this embodiment, all mails destined to the user are collected at the message processing device regardless of a current location of the user, so that the user only needs to view mails on this message processing device. In this way, it is possible to realize the collective management of mail logs and information on action (response, distribution, deletion, etc.) with respect to each mail, so that it becomes possible to construct a highly desirable processing environment for processing the mail media that are received irregularly in a variety of forms, under the unified policy (according to each user's preference).

Note that, in the above, the exemplary configuration in which the message processing device itself has a user interface has been described, and such a message processing device has been compared with the other mail processing devices (portable PC, PDA) in terms of their handling, etc., but the present invention is also applicable to a message processing device without a user interface.

Figure 6:
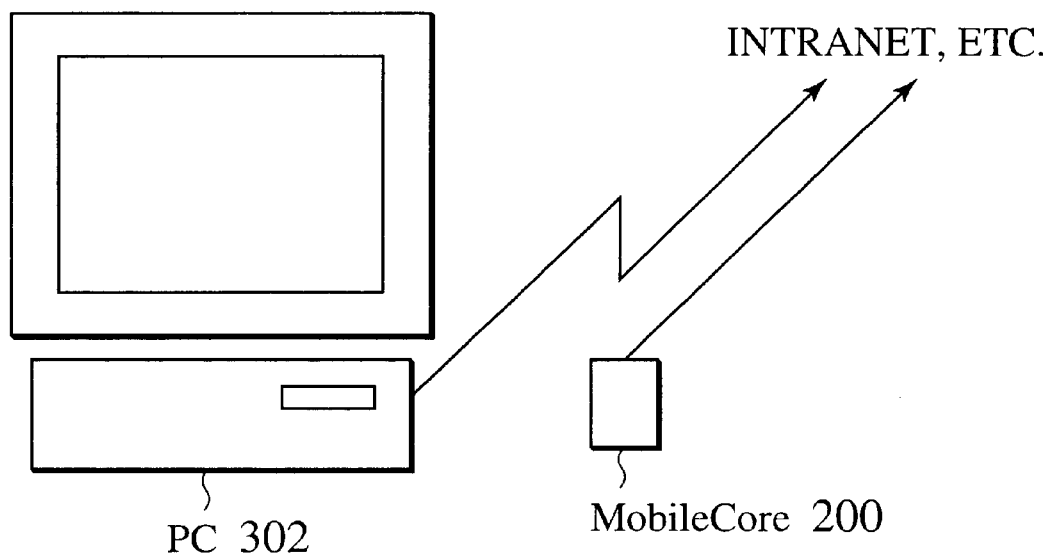
FIG. 6 is a diagram showing a manner of using a message processing device according to the present invention in a modified configuration without a user interface.

Namely, as shown in FIG. 6, the message processing device (MobileCore) 200 without a user interface is connected to another device (PC) with a user interface, either directly or via the intranet, home network, etc., and they are operated in cooperation such that the user can process mails in the message processing device 200 by using the user interface of that another device.

In this exemplary configuration, the message processing device 200 can be provided with no or very small input mechanism and/or display mechanism, so that the message processing device 200 can be formed in a compact shape which has a superior portability and enables easy connection to PDA or PC, such as a card shape or a stick shape.

As described, according to the present invention, the following effects can be achieved.

Namely, in the conventional mobile communications, messages such as mails of the user are downloaded into portable PCs so that the received messages are inevitably scattered at a plurality of storing locations, and there has been a problem that the collective management cannot be realized. Also, in the case of receiving data from a plurality of mail servers, there has been a problem regarding how to access information delivery servers by accounting for a connected environment at a visited site. This is because there is a need to account for the access policy such as that a security protocol such as SSH/SOCKS must be used in order to access an external mail server, in the case of being connected inside the organization network, for example.

According to the present invention, it is possible to realize the collective message processing and the unified message accesses by storing and managing messages from a plurality of message delivery servers in the message processing device that is unique to the user.

In addition, it is possible to realize an operation environment familiar to the user, for example, by displaying messages in cooperation with the surrounding browsing environment, and it is possible to display messages even under a limited display environment such as that of PDA, even in a limited form, by processing the message contents suitably.

Moreover, the message processing device can recognize the connected network environment and determine a communication method with respect to the message delivery server by accounting for the connected network environment, so that it is possible to provide an easy operation environment in which the user is freed from a task of setting up a communication procedure by taking the connected network in consideration consciously.

Thus, according to the present invention, it becomes possible to realize a centralized management of messages delivered from a plurality of information servers on networks, at the message processing device. In addition, messages stored in this message processing device can be handled in a unified way. Moreover, a better handling can be obtained by utilizing a user interface of another device that is operated in cooperation with this message processing device, and a better portability can be obtained by providing a user interface on this message processing device itself.

It is to be noted that messages in forms of e-mails are primarily described in the above, but the present invention is also applicable to a system for handling messages other than e-mails.

It is also to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the message processing device of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A portable message processing device connected to different networks at different times, comprising:

a registration unit configured to register a plurality of message servers distributed on a plurality of networks, according to a command of a user of the message processing device;

a determination unit configured to recognize the networks to which the message processing device is currently connected, and to determine communication methods for accessing the message servers registered by the registration unit;

a memory unit configured to store messages in the message processing device;

a message collection unit configured to collect messages addressed to the user from the message servers, using the communication methods determined by the determination unit, and to store the messages into the memory unit; and a message transmission unit configured to transmit the messages stored in the memory unit, in response to a request from another device for carrying out message input/output, the another device connected to one of the networks to which the message processing device is currently connected.

2. The message processing device of claim 1, further comprising a unit configured to store the messages collected by the message collection unit and stored in the memory unit, into an external memory device, according to a condition specified by the user.

3. The message processing device of claim 2, further comprising a unit configured to delete the messages collected by the message collection unit and stored in the memory unit and the external memory device, according to a condition specified by the user.

4. The message processing device of claim 1, wherein the message transmission unit transmits the messages collected by the message collection unit and stored in the memory unit by processing the messages according to functions provided at said another device, upon receiving the request from said another device.

5. The message processing device of claim 1, wherein the determination unit inquires a network domain to which the message processing device is currently connected, and determines accessible message servers among the message servers registered by the registration unit and the communication methods for accessing the accessible message servers, according to the network domain.

6. The message processing device of claim 1, further comprising a notification unit configured to notify an address of the message processing device to said another device, as a voluntary advertisement inside the network or in response to an inquiry from said another device.

7. The message processing device of claim 1, wherein the message collection unit collects the messages by accessing the message servers via a radio communication device which is built-in inside the message processing device or externally connected to the message processing device, and stores the message into the memory unit in response to a user request entered from an input device associated with the message processing device, and wherein the message processing device further comprises a display unit configured to display the messages stored in the memory unit on a display screen associated with the message processing device, in response to a request of the user entered from the input device.

8. The portable message processing device according to claim 1 wherein the another device has an interface for viewing the messages, and wherein the memory unit is configured to maintain the messages while and after the messages are viewed on the another device.

9. A portable message processing device connected to different networks at different times, comprising:

a notification unit configured to provide an address of the message processing device to another device for carrying out message input/output, which is connected to a network to which the message processing device is currently connected;

a memory unit configured to temporarily store a transmission message entered from said another device, in response to a request from said another device;

a message server selection unit configured to specify a selected message server to transmit the transmission message among a plurality of message servers distributed on a plurality of networks; and a transfer unit configured to transfer the transmission message temporarily stored in the memory unit to the selected message server specified by the message server selection unit.

10. A message processing system for carrying out message exchanges with a plurality of message servers distributed on a plurality of networks specified by a user of the message processing system, comprising:

a portable message processing device connected to different networks at different times; and another device for carrying out message input/output with respect to the message processing device;

wherein the message processing device includes:

a notification unit configured to provide an address of the message processing device to said another device, which is connected to one of the networks to which the message processing device is currently connected;

a memory unit configured to store messages in the message processing device;

a message collection unit configured to collect messages addressed to the user by accessing the message servers according to information regarding communication methods for accessing the message servers from the network to which the message processing device is currently connected, and to store the messages into the memory unit;

a message transmission unit configured to transmit the messages stored in the memory unit, in response to a request from said another device; and a transfer unit configured to transfer a transmission message having a destination message server which is reachable from the network to which the message processing device is currently connected, among transmission messages entered from said another message, in response to a request from said another device.

11. The message processing system according to claim 10, wherein the another device has an interface for viewing the messages, and wherein the memory unit is configured to maintain the messages while and after the messages are viewed on the another device.

12. A message processing method utilizing a portable message processing device connected to different networks at different times, comprising the steps of:

recognizing a network to which the message processing device is currently connected, and determining communication methods for accessing a plurality of message servers which are distributed on a plurality of networks and registered in the message processing device in advance;

collecting messages addressed to the user from the message servers, using the communication methods determined by the determining step, and storing the messages into a memory provided in the message processing device; and transmitting the messages stored in the memory, in response to a request from another device for carrying out message input/output, the another device connected to one of the networks to which the message processing device is currently connected.

13. The message processing method according to claim 12, wherein the another device has an interface for viewing the messages, and wherein the memory unit is configured to maintain the messages while and after the messages are viewed on the another device.

* * * * *